C. D. RAREY.
FASTENING DEVICE.
APPLICATION FILED FEB. 18, 1915.

1,209,885.

Patented Dec. 26, 1916.

Witnesses
G. F. Baker
H. P. Jennings

Inventor
Clifford D. Rarey
by
Eugene L. Greenewald
Attorney

UNITED STATES PATENT OFFICE.

CLIFFORD D. RAREY, OF KENNEWICK, WASHINGTON.

FASTENING DEVICE.

1,209,885. Specification of Letters Patent. Patented Dec. 26, 1916.

Application filed February 18, 1915. Serial No. 9,072.

*To all whom it may concern:*

Be it known that I, CLIFFORD D. RAREY, a citizen of the United States, and a resident of Kennewick, county of Benton, State of Washington, have invented certain new and useful Improvements in Fastening Devices, of which the following is a specification.

My invention relates to fastening devices generally and more particularly to a fastening device the head end of which has an eye.

The principal object of my invention is to provide the head of an ordinary tack, nail or screw with an eyelet which is located so close to the head of the fastening device that when the latter is secured to a support the eyelet will be very close to the supporting surface so as to serve as a means for anchoring articles close to said supporting surface. Ordinary screw eyes do not meet the needs as they usually project too far out from the surface to which they are secured.

The above and other objects and the novel features of the invention will be apparent from the following description, taken in connection with the accompanying drawings, in which—

Figure 1:
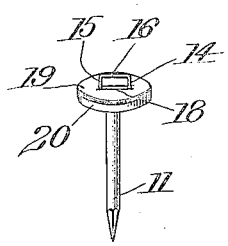
Figure 2:
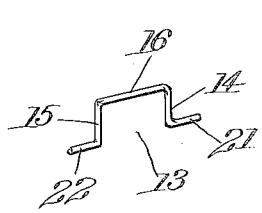
Figure 3:
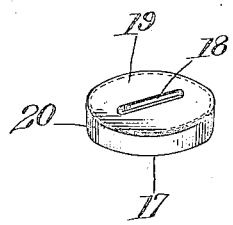
Figure 4:
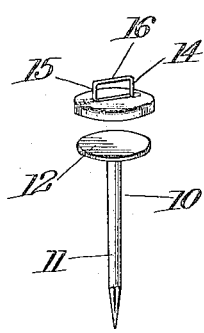
Figure 5:
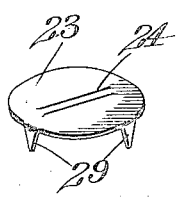
Figure 6:
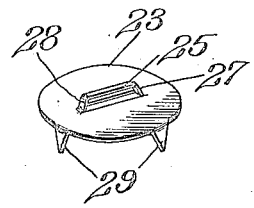
Figure 7:
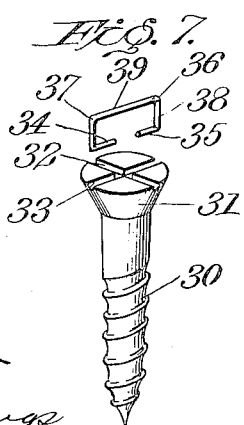
Figure 8:
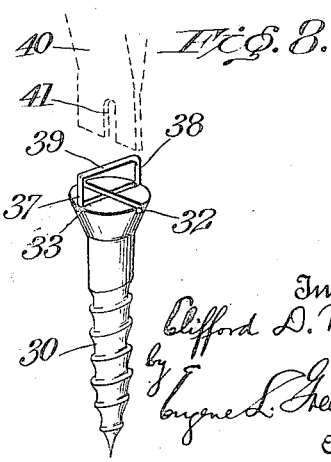

Figure 1 is a perspective view of a nail or tack embodying my invention; Fig. 2 is a perspective view of a metal wire bent to form the eyelet of the device; Fig. 3 is a perspective view of a plate by means of which the bent wire is held in place on an ordinary headed fastening device. Fig. 4 is a perspective view showing the plate and wire in position to be attached to the fastening device; Figs. 5 and 6 are perspective views illustrating another form of plate and eye embodying my invention; and Figs. 7 and 8 are perspective views illustrating an ordinary screw provided with an eyelet according to my invention.

Referring to the drawing, and particularly to Fig. 4, in carrying out the invention, an ordinary headed metal fastening device is used, such as the tack or nail 10 which has the shank 11 and the head 12, the top surface of which is of uniform diameter. The part which constitutes the eye of the fastening device consists of a substantially U-shaped metal wire 13 such as illustrated in Fig. 2. The wire 13 is bent so as to provide two substantially parallel portions 14 and 15 which are joined by the part 16 which constitutes the top of the eye and when the wire is secured in place on the head 12 the said top 16 of the eye is located close to the top of the head of the nail.

In order to fasten the wire loop 13 in place on the head 12 I employ a circular metal plate 17 which has a slot 18 in the flat portion 19 thereof and a marginal flange 20. The member 17 is thus cup-shaped and of sufficient internal diameter to receive the head 12. The bent wire eye 13 is slipped into place in the member 17, the top 16 and parts 14 and 15 of said eye projecting through the radial slot 18. The ends 21 and 22 of the bent wire 13 extend laterally at right angles to the parts 14 and 15 respectively and engage the inner face of the flat part 19 of the plate 17, being located between the plate 17 and the head 12.

The circular plate 23 shown in Figs. 5 and 6 is slit along the lines 24 so that the metal between those lines may be forced outwardly as shown in Fig. 6 to form an eye substantially similar to the eye of the device shown in Fig. 1. The eye shown in Fig. 6 has the top part 25 and the substantially parallel parts 27 and 28 whereby the top is connected to the plate 23 and by the latter to the head of the nail. The plate 23 may be soldered to the head of the fastening device or it may be provided at intervals with tongues 29 which may be bent under the head of the tack to hold the eye in place.

In Figs. 7 and 8 I have shown an ordinary headed screw embodying my invention. The screw is provided with the threaded shank 30 and the head 31. The top surface of the head 31 has the two slots 32 and 33 therein, intersecting substantially at right angles. The slot 32 is the slot usually provided for the screw driver and the other slot 33 is for the purpose of receiving the ends 34 and 35 of the bent wire eye 36. The ends 34 and 35 are bent inwardly at right angles to the parallel parts 37 and 38 which latter are joined by the top 39 of the eye. When the ends 34 and 35 of the eye 36 are fitted in the slot 33 they are countersunk below the surface of the top of the head 31 and may be soldered in place to permanently unite the eye to the screw. The head of an ordinary nail or tack may be provided in like manner with a slot in which an eyelet may be soldered. The inner side of the eye in each case is formed by a part separate from the wire or loop, the top of the fastening nail or screw. The top 39 of the eye, as in the previous devices described, is disposed close to the top of the head of the fastening device and substantially parallel thereto. It will also be seen that in all forms the eye is located within the marginal edge of the head of the device. As indicated in Fig. 8, a screw-driver 40, provided with an end having a slot 41, may be used to drive the screw, the slot 41 being arranged to fit the eye on the screw head.

It will be seen that I have provided a simple article of manufacture having an eye which is practically invisible and permanently united to the head of an ordinary screw, nail or tack. The device may be used any place where it is desired to fasten an article close to a support.

While I have shown and described the invention in detail I do not wish to be limited to the exact construction disclosed as various modifications may be made without departing from the spirit of the invention as set forth in the claims annexed.

What is claimed is:

1. A new article of manufacture comprising a fastening device provided with a head and a central shank, said head having a flat top surface carrying a permanently open eye disposed close to the top of said head, said eye consisting of a separately formed narrow metal member permanently secured to said head.

2. A new article of manufacture comprising a fastening device provided with a head and a pointed central shank, said head having an eye permanently secured to the top thereof, said eye consisting of a length of wire bent intermediate its ends and having its ends secured to said head.

3. A fastening device having a head and a shank, the head being provided with a transversely extending recess, and a bent member secured to said head and having a part terminating in said recess said bent member being disposed within the margin of said head and having a portion thereof disposed above the plane of the head to form a permanent eye on said head.

4. A fastening device having a head and a screw-threaded shank, and an eye on said head comprising a wire spaced intermediate its ends from the top of said head and united at both ends to said head.

5. The combination with a fastening device formed with a slot extending across one end thereof, of a substantially U-shaped member having its ends secured in said slot, and a second slot intersecting the first-mentioned slot.

6. The combination with a screw-threaded fastening device having a head provided with a slot in the top thereof, said head being formed with a second slot intersecting the first-mentioned slot, of a length of wire having its ends permanently secured in said second slot and flush with the top of said head, said wire having a part intermediate the ends thereof disposed apart from the top of said head and forming an eye on said fastening device.

7. The combination with a fastening device having a head provided with a screw-threaded shank and means whereby said head may be engaged by a tool to turn the device, of an eye secured to the top of said head.

In testimony whereof I affix my signature in presence of two witnesses.

CLIFFORD D. RAREY.

Witnesses:
F. R. JEFFREY,
BLANCHE SELZER.